United States Patent [19]

Winkler et al.

[11] 4,326,246
[45] Apr. 20, 1982

[54] CIRCUIT ARRANGEMENT OF AN INVERTED CURRENT RECTIFIER WITH SELF COMMUTATION

[75] Inventors: Jiri Winkler; Milan Kondr; Richard Jelinek; Jaroslav Hlousek; Jan Krtek; Josef Cibulka, all of Prague; Vladimir Mlynar; Josef Simacek, both of Opava, all of Czechoslovakia

[73] Assignee: CKD Praha, oborovy podnik, Prague, Czechoslovakia

[21] Appl. No.: 250,251

[22] Filed: Apr. 2, 1981

[30] Foreign Application Priority Data

Apr. 2, 1980 [CS] Czechoslovakia ............... 2296-80

[51] Int. Cl.³ ........................................... H02M 1/06
[52] U.S. Cl. ..................................... 363/138; 363/37; 318/711; 318/345 G
[58] Field of Search .......... 318/711, 801, 808, 345 G; 363/37, 136–138

[56] References Cited

U.S. PATENT DOCUMENTS 3,612,973 10/1971 Kuniyoshi .......................... 363/137
4,054,818 10/1977 Risberg ........................... 363/138 X Primary Examiner—William M. Shoop

[57] ABSTRACT

Inverted current rectifier with self commutation for smaller and medium output and three-stage commutation in which the disconnection of thyristors of the inverted rectifier and the current commutation in the phases are separated and the accumulated power of capacitors of the inverted rectifier is, without losses, discharged to the current source and thus to the load of the inverted rectifier.

4 Claims, 1 Drawing Figure

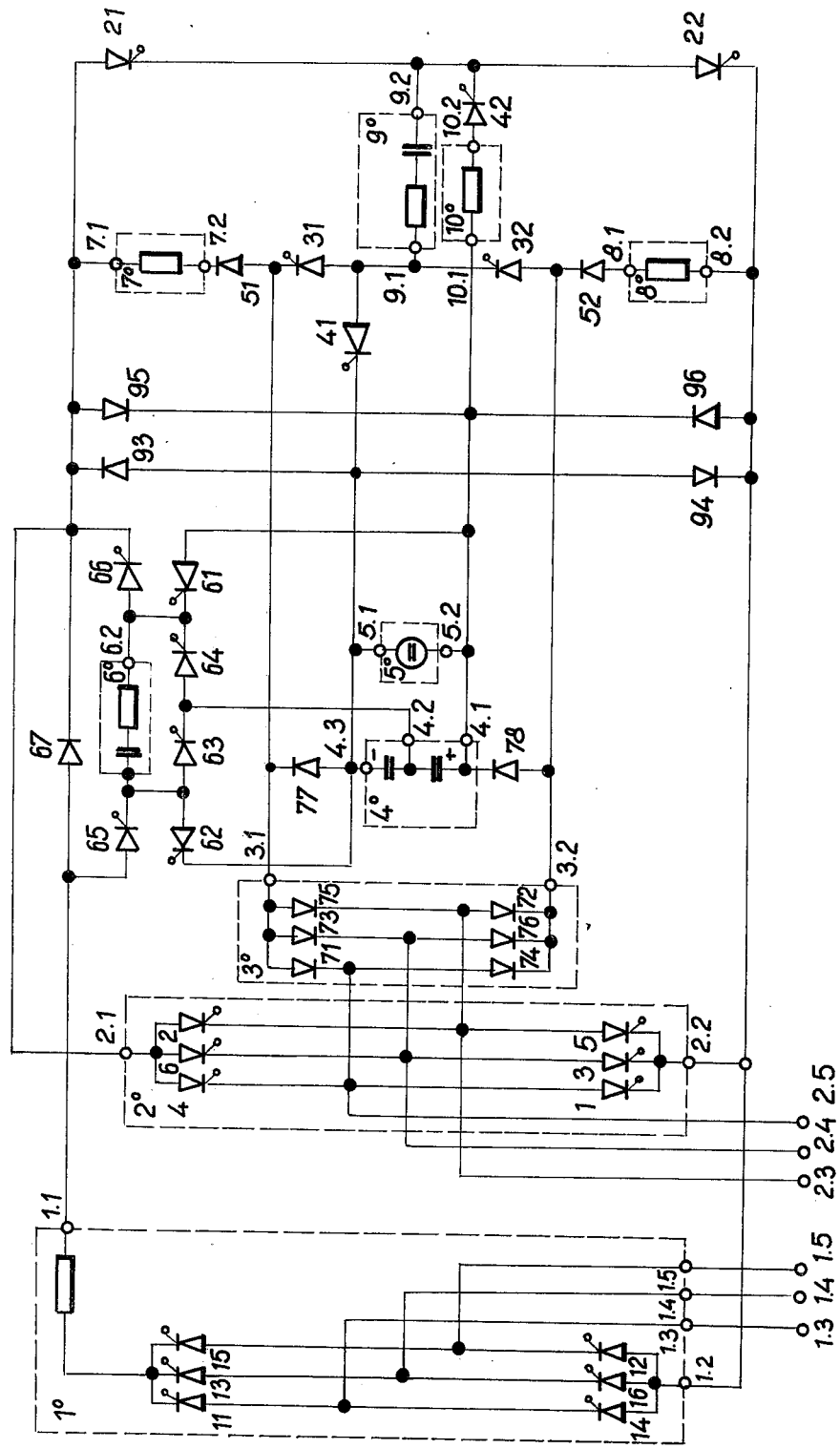

CIRCUIT ARRANGEMENT OF AN INVERTED CURRENT RECTIFIER WITH SELF COMMUTATION

BACKGROUND OF THE INVENTION

The invention relates to an inverted current rectifier with self commutation which is suitable for drives with one or more asynchronous and synchronous motors, in addition to other types of load impedances.

A number of inverted current rectifiers are known where problems of the self commutation of the rectifier and of accumulation of power in load inductances are solved. A rather progressive and perspective method is the so-called three-stage commutation of inverted current rectifiers wherein the disconnection of thyristors of the inverted rectifier and the current commutation in the phase are separated. There is, however, a problem with accumulation of power, which has to be, with smallest possible losses, discharged from the capacitors of the inverted rectifier in order to obtain an equilibrium. This problem leads to different solutions for inverted rectifiers of large output and inverted rectifiers of small output. Due to the complexity of the power part and of the regulation part, solutions, as for instance the inverting of accumulated power from DC capacitors in the inverted rectifier to the supply network, are unsuitable for inverted rectifiers of smaller and medium output. On the other hand solutions using the simplest means for discharge of the accumulated power by a parallel resistance represent substantial losses. Another problem of inverted current rectifiers with two-stage and three-stage commutation is the problem of breakdown conditions which may occur on the load (short circuits, disconnection of the load) or directly in the rectifier (parasite pulses on thyristors, failures of the regulating circuit and others). Some of these failures have the characteristic of random processes (for instant parasite pulses caused by transient processes in other electrical arrangements) and it is rather desirable that the inverted rectifier should maintain its function without the reaction of protective circuits. For industrial applications of drives of demanding operations a thus solved question of reliability in the conception of power circuits of the inverted rectifier is rather desirable.

SUMMARY OF THE INVENTION

It is an object of this invention to find a solution to the problem of discharge of accumulated power without losses of inverted current rectifiers with three-stage commutation and with maximum resistivity to interferring influences, particularly to breakdown conditions due to parasite impulses on thyristors. According to this invention, this is solved in that a block of the inverted rectifier, connected by DC input terminals to output terminals of a current source by way of a main separating diode, is connected by AC output terminals both to a load and to an accumulating rectifier, the DC terminals of which are, through separating diodes, connected to external terminals of accumulating capacitors, comprising a series connection of two capacitors, where to these external terminals a DC charging source is connected, whereby the first external terminal is also connected both to the anode of a first auxiliary accumulating thyristor, the cathode of which is connected to the cathode of a fourth and to the anode of a sixth auxiliary accumulating thyristor and to the cathodes of a third and fourth limiting diode, where the anode of a third limiting diode is connected to the cathode of the main separating diode and the anode of the fourth limiting diode is connected to a negative outlet terminal of the current source, whereby the second external terminal of the accumulating capacitors is connected both to a cathode of a second auxiliary thyristor, the anode of which is connected with the cathode of the fifth and with the anode of the third auxiliary accumulation thyristor and also with anodes of the first and second limiting diode, where the cathode of the first limiting diode is connected with the anode of the third limiting diode, with the first terminal of a first overswing reactor and with the anode of the first accumulation thyristor, the cathode of which is connected both with the anode of the second commutation thyristor and with the second terminal of a commutation impulse circuit and also over a second charging thyristor and charging inductance with cathodes of the third and fourth limiting diode and also over a second overswing reactor, a second overswing diode, a fourth commutation thyristor, a third commutation thyristor and a first overswing diode to the second terminal of the first overswing reactor, whereby the common junction of the third commutation thyristor and the fourth commutation thyristor is connected both with the first terminal of the commutation impulse circuit, and through a first charging thyristor, with anodes of the first and second limiting diode, common junction of the fourth commutation thyristor and the second overswing diode is connected to the anode of the second separating diode, the common junction of the first overswing diode and the third commutation thyristor is connected to the cathode of the first separating diode, furthermore the cathode of the third and the anode of the fourth auxiliary accumulation thyristor are mutually interconnected and connected with the central terminal of the accumulation capacitors, the anode of the fifth auxiliary accumulation thyristor is connected with the anode of the main separating diode, the cathode of the sixth auxiliary accumulation thyristor is connected with the cathode of the main separating diode and the accumulation block is connected between the cathode of the fifth and the anode of the sixth accumulation thyristor.

The inverted current rectifier according to this invention operates with a three-stage commutation and its main advantage is its high resistivity to breakdown conditions.

DESCRIPTION OF THE DRAWING

The accompanying drawing shows an exemplary circuit arrangement of an inverted current rectifier according to this invention.

DESCRIPTION OF THE PREFERRED EMBODIMENT

The inverted current rectifier as shwon in the drawing is supplied by a current source $1^o$ comprising a three-phase thyristor bridge with thyristors 11 to 16 with smoothening inductances, the alternating terminals 1.3, 1.4, 1.5 of which are connected to a rectifier transformer, possibly by way of separating reactors to a supply network. The DC outlet terminals 1.1, 1.2 of the current source $1^o$ are connected through a main diode 67 to inlet terminals 2.1, 2.2 of the block $2^o$ of the inverted rectifier, which is connected by AC output terminals 2.3, 2.4, 2.5 both to a load (not shown in the drawings) and to an accumulating rectifier $3^o$.

The block $2^o$ of the inverted rectifier comprises a bridge interconnection of main thyristors 1 to 6. The DC terminals 3.1, 3.2 of the accumulating rectifier $3^o$ which comprise a bridge interconnection of accumulating diodes 71 to 76, are connected through separating diodes 77, 78 to external terminals 4.1, 4.3 of a block of accumulating capacitors $4^o$ comprising two series-connected capacitors C1, C2. A charging source $5^o$ is connected in parallel to these external terminals 4.1, 4.3, while the first external terminal 4.1 is furthermore connected both to the anode of a first auxiliary accumulation thyristor 61, the cathode of which is connected to the cathode of a fourth and to the anode of a sixth accumulation thyristor 63, 66 and also to the cathodes of a third and fourth limiting diodes 95, 96. The anode of the third limiting diode 95 is connected to the cathode of the main separating diode 67 and the anode of the fourth limiting diode 96 is connected to the negative output terminal 1.2 of the current source $1^o$.

The second external terminal 4.3 of the block of accumulation capacitors $4^o$ is connected both to the cathode of a second accumulation thyristor 62, the anode of which is connected with the cathode of a fifth and with the anode of a third accumulation thryistors 65, 63 and also with anodes of a first and second limiting diodes 93, 94 respectively. The cathode of the first limiting diode 93 is connected with the anode of the third limiting diode 95, with the first terminal 7.1 of a first overswing reactor $7^o$ and with the anode of a first commutation thyristor 21, the cathode of which is connected both with the anode of a second commutation thyristor 22 and with the second terminal 9.2 of a commutation impulse circuit $9^o$ and also over a second charging thyristor 42 and a charging inductance $10^o$ (with terminals 10.1, 10.2) with cathodes of the third and fourth limiting diode 95, 96 respectively. The cathode of the second commutation thyristor 22 is connected both with the anode of the fourth limiting diode 96 and, through a second overswing reactor $8^o$ (with terminals 8.1, 8.2), a second overswing diode 52, a fourth commutation thyristor 32, a third commutation thyristor 31 and a first overswing diode 51, to the second terminal 7.2 of the first overswing reactor $7^o$. The cathode of the fourth commutation thyristor 32 is connected both with the first terminal 9.1 of the commutation impulse circuit $9^o$ and, through a first charging thyristor 41, with anodes of the first and second limiting diodes 93, 94 respectively. The common junction of the fourth commutation thyristor 32 and of the second overswing diode 52 is connected to the anode of the second separating diode 78. The common junction of the first overswing diode 51 and of the third commutation thyristor 31 is connected to the cathode of the first separating diode 77. The cathode of the third and the anode of the fourth auxiliary accumulation thyristors 62, 64 are mutually interconnected and connected with the central terminal 4.2 of the block of accumulation capacitors $4^o$.

The anode of the fifth auxiliary accumulation thyristor 65 is connected with the anode of the main separating diode 67. The cathode of the sixth auxiliary accumulation thyristor 66 is connected with the cathode of the main separating diode 67. An auxiliary accumulation block $6^o$ (with terminals 6.1, 6.2) is connected between the cathode of the fifth and the anode of the sixth auxiliary accumulation thyristor 65, 66.

Let us suppose for explanation of the operation that the main current of the inverted current rectifier passes from terminal 1.1 of the current source $1^o$ over the main separating diode 67 to terminal 2.1 of block $2^o$ of the inverted rectifier, furthermore over the main thyristor 2 of block $2^o$ to terminal 2.3 of the load, from load via terminal 2.4 to the thyristor 3 of block $2^o$ and over the outlet terminal 2.2 of block $2^o$ back to terminal 1.2 of the current source $1^o$.

Let us furthermore suppose that a commutation of thyristor 2 should be made to thyristor 4 of block $2^o$ of the inverted rectifier. At the moment of commutation, the capacitor of the commutation impulse circuit $9^o$ has on terminal 9.1 a positive polarity. By closing the commutation thyristors 21 and 31, the current from thyristor 2 of block $2^o$ of the inverted rectifier is transferred to the auxiliary branch determined by following elements: thyristor 21, circuit $9^o$, thyristor 31, diode 75, accumulating rectifier $3^o$, and again load terminal 2.3. The steepness of commutation to this branch is determined by the limiting inductance of circuit $9^o$. The current of the current source $1^o$, passing through the auxiliary branch, changes the polarity of the capacitor of circuit $9^o$ to positive polarity on terminal 9.2 and, if the voltage conditions on the capacitor of circuit $9^o$ are equalized with the instantaneous voltage between commutating phases and the following thyristor of the block $2^o$ of the inverted rectifier has a closing impulse, a commutation takes place from this auxiliary branch to another auxiliary branch determined by elements: thyristor 4 of block $2^o$ of the inverted rectifier, diode 74 of accumulating rectifier $3^o$, diode 78, capacitors C1, C2 of block $4^o$, diode 77, diode 75 of rectifier $3^o$ and again the outlet terminal 2.3. At this moment begins also the proper current commutation between phases of the load—namely a reduction of the current in phase of terminal 2.3 where, through diodes 74 and 75, a series connection of capacitors C1 and C2 of block $4^o$ is accomplished at a polarity preventing passage of current and simultaneously an increase of current at terminal 2.5, where current is supplied directly from the source over thyristor 4 of block $2^o$. The sum of currents at phases of terminal 2.3 and 2.5 is constant as the inverted rectifier is fed by the current source $1^o$. After closing the commutation thyristors 31 and 21 simultaneously, an overswinging of the capacitor of circuit $9^o$ takes place over the diode 51 and the overswing reactor $7^o$, what stabilizes the change of polarity of the commutation capacitor of circuit $9^o$ at small currents or at idle operation. After finishing commutation, the charging thyristors 42 and 41, which charge the voltage on terminal 9.2 to a positive value from the auxiliary voltage source $5^o$ with a certain delay, are closed.

At each commutation a certain power from the load inductance is absorbed in the accumulating capacitors $4^o$ determined by parameters of motors or of some other kind of load. It is necessary to discharge from capacitors C1, C2 of block $4^o$ such a power so that the energetic equilibrium is maintained on a technically optimum voltage. With discharge from the capacitors, the voltage would increase and a voltage breakdown could take place. By closing the thyristors 61, 63, a certain power is removed from capacitor C1 of block $4^o$ to the auxiliary accumulation capacitor of block $6^o$. The thyristors 65 and 66 are closed a certain time after thyristors 61, 63. The capacitor of block $6^o$ has a positive polarity on terminal 6.2. A current commutation takes place in the DC intermediate circuit from diode 67 to a track determined by elements: thyristor 65, block $6^o$, thyristor 66, and the capacitor of block $6^o$ is discharged by current from source $1^o$ to zero. The power of the capacitor of block $6^o$ is supplied to the current source $1^o$ and thus to the load of the inverted current rectifier. The power from capacitor C2 of block $4^o$ is supplied by thyristors 62 and 64 and is again discharged over thyristors 65 and 66 from the auxiliary accumulation capacitor block $6^o$. The capacitors 61, 63 and 62,64 are periodically alternating at a frequency determined from closing of main and commutation thyristors of the inverted current rectifier or at a frequency which is dependent on the frequency of the inverted rectifier and is determined by a voltage sensing element on capacitors C1, C2.

Overvoltage conditions due to possible interruption of the current source and a following overvoltage on smoothing inductances of source $1^o$ are very dangerous for an inverted rectifier. The four diodes 93, 94, 95, 96 protect the inverted rectifier from overvoltage. The overvoltage on the side of the inverted rectifier (on terminals 2.1, 2.2) is limited by these diodes to the voltage level on capacitors of block $4^o$, the overvoltage on thyristors of block $2^o$ being limited by these diodes in cooperation with diodes of the accumulating rectifier $3^o$. For instance, the commutation overvoltage with positive polarity on the cathode of thyristor 5 of block $2^o$ is limited to the level of capacitors $4^o$ by this circuit: cathode thyristor 3, terminal 2.2, diode 96, terminal 4.1, terminal 4.3, diodes 77 and 75, anode of thyristor 5.

The inverted current rectifier according to this invention operates with a three stage commutation and its great advantage is also a high resistivity to breakdown conditions, particularly to short circuits and parasite impulses.

For instance a coincidence of parasite impulses on commutation thyristors 31, 32 does not generate a short circuit on capacitors $4^o$ due to separating diodes 77, 78 and leads solely to a short circuit on the motor. A coincidence of impulses on thyristors 21, 22 causes again no short circuit on the current source $1^o$ provided the following commutation circuits are functioning properly. Single parasite impulses on thyristors 61 to 65 have again no substantial influence on the functioning and do not cause reaction of fuses.

We claim:

1. Circuit arrangement of an inverted current rectifier with self commutation comprising a current source ($1^o$), a block ($2^o$) of the inverted rectifier, an accumulation rectifier ($3^o$), accumulation capacitors ($4^o$) with separating diodes (77, 78), a DC charging source ($5^o$), a block ($6^o$) for auxiliary accumulation with auxiliary accumulation thyristors (61 to 66) and a main separating diode (67), overswing reactors ($7^o$, $8^o$) with overswing diodes (51, 52), commutation thyristors (21, 22, 31, 32), a commutation impulse circuit ($9^o$), a charging inductance ($10^o$), charging thyristors (41, 42) and limiting diodes (93, 94, 95, 96), the block ($2^o$) of the inverted rectifier, connected by its DC inlet terminals (2.1, 2.2) to inlet terminals (1.1, 1.2) of the current source ($1^o$), is furthermore connected over the main separating diode (67) by its outlet AC terminals (2.3, 2.4, 2.5) both to a load and to the accumulation rectifier ($3^o$), the DC terminals (3.1, 3.2) of which are connected through separating diodes (77, 78) to external terminals (4.1, 4.3) of a series connection of accumulation capacitors ($4^o$), to which external terminals (4.1, 4.3) a DC charging source ($5^o$) is connected in parallel, the first external terminal (4.1) being furthermore connected to the anode of the first auxiliary accumulation thyristor (61), the cathode of which is connected to the cathode of the fourth and to the anode of the sixth auxiliary accumulation thyristor (64, 66) respectively, and to cathodes of the third and fourth limiting diode (95, 96) respectively, whereby the anode of the third limiting diode (95) is connected to the cathode of the main separating diode (67) and the anode of the fourth limiting diode (96) is connected to the negative outlet terminal (1.2) of the current source ($1^o$), whereby the second external terminal (4.3) of the accumulating capacitors ($4^o$) is connected both to the cathode of the second auxiliary accumulation thyristor (62), the anode of which is connected with the cathode of the fifth and anode of the third auxiliary accumulation thyristor (65, 63) respectively, and with anodes of the first and second limiting diode (93, 94) respectively, whereby the cathode of the first limiting diode (93) is connected with the anode of the third limiting diode (95), with the first terminal (7.1) of the first overswing reactor ($7^o$) and with the anode of the first commutation thyristor (21), the cathode of which is connected both with the anode of the second commutation thyristor (22), with the second terminal (9.2) of the commutation impulse circuit ($9^o$) and also, through the second charging thyristor (42) and charging inductance ($10^o$), with cathodes of the third and fourth limiting diodes (95, 95) respectively, the cathode of the second commutation thyristor (22) is connected both with the anode of the fourth limiting diode (96) and, through the second overswing reactor ($8^o$), the second overswing diode (52), the fourth commutation thyristor (32), the third commutation thyristor (31) and the first overswing diode (51), to the second terminal (7.2) of the first overswing reactor ($7^o$), whereby the common junction of the third commutation thyristor (32) is connected both with the first terminal (9.1) of the commutation impulse circuit ($9^o$) and, through the first charging thyristor (41), with anodes of the first and second limiting diodes (93, 94), respectively, the common junction of the fourth commutation thyristor (32) and of the second overswing diode (52) is connected to the anode of the second limiting diode (78), the common junction of the first overswing diode (51) and of the third commutation thyristor (31) is connected to the cathode of the first overswing diode (77), furthermore the cathode of the third and the anode of the fourth auxiliary accumulation thyristor (63, 64), respectively are mutually interconnected and connected to the central terminal (4.2) of the accumulating capacitors ($4^o$), the anode of the fifth auxiliary accumulation thyristor (65) is connected with the anode of the main separating diode (67), the cathode of the sixth auxiliary accumulation thyristor (66) is connected with the cathode of the main separating diode (67) and the auxiliary accumulation block ($6^o$) is connected between the cathode of the fifth and the anode of the sixth auxiliary accumulation thyristor (65, 66), respectively.

2. A circuit arrangement of an inverted current rectifier with self commutation as claimed in claim 1, wherein the accumulating rectifier ($3^o$) comprises a bridge connection of accumulation diodes (71 to 76).

3. A circuit arrangement of an inverted current rectifier with self commutation as claimed in claim 1, wherein the block ($2^o$) of the inverted rectifier comprises a bridge connection of main thyristors (1 to 6).

4. A circuit arrangement of an inverted current rectifier with self commutation as claimed in claim 1, wherein the current source ($1^o$) comprises a three-phase bridge of thyristors (11 to 16) with a smoothening inductance, the AC inlet terminals (1.3, 1.4, 1.5) of which being connected to a transformer or over separating reactors to a supply network.

* * * * *